(12) United States Patent
Fehmers et al.

(10) Patent No.: US 6,856,912 B2
(45) Date of Patent: Feb. 15, 2005

(54) REMOVING IRREGULARITIES FROM SEISMIC DATA CAUSED BY TUBE WAVES

(75) Inventors: Gijsbert Christiaan Fehmers, Rijswijk (NL); William Alexander Mulder, Rijswijk (NL); Rene-Edouard Andre Michel Plessix, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/477,296

(22) PCT Filed: May 6, 2002

(86) PCT No.: PCT/EP02/05085
§ 371 (c)(1),
(2), (4) Date: Nov. 10, 2003

(87) PCT Pub. No.: WO02/093196
PCT Pub. Date: Nov. 21, 2002

(65) Prior Publication Data
US 2004/0172197 A1 Sep. 2, 2004

(51) Int. Cl.⁷ .................................................. G06V 1/00
(52) U.S. Cl. ............................... 702/14; 702/6; 702/18
(58) Field of Search ............................. 702/18, 17, 14, 702/9; 367/57, 43, 38, 25; 703/152.19, 10, 5; 181/105

(56) References Cited

U.S. PATENT DOCUMENTS

| | | | |
|---|---|---|---|
| 4,208,732 A | | 6/1980 | Ruehle |
| 4,992,995 A | * | 2/1991 | Favret .......................... 367/43 |
| 5,237,538 A | * | 8/1993 | Linville et al. ................ 367/38 |
| 5,392,213 A | * | 2/1995 | Houston et al. ............... 702/17 |
| 5,572,483 A | | 11/1996 | Chambers et al. |
| 6,166,994 A | * | 12/2000 | Jeffryes ........................ 367/57 |
| 2003/0173143 A1 | * | 9/2003 | West ........................... 181/105 |

OTHER PUBLICATIONS

International Search Report dated Sep. 4, 2002.

* cited by examiner

Primary Examiner—John Barlow
Assistant Examiner—Xiuqin Sun (57) ABSTRACT

Method of removing irregularities caused by tube waves from seismic data obtained in a borehole seismic survey, using a set of seismic or sources and a set of seismic receivers each arranged in a borehole, in which seismic data is time shifted based on an estimated tube wave velocity, filtered and then the time shift is reversed and applied to the original data set resulting in a corrected set, which is again time shifted opposite to the original time shift to remove and identify tube wave irregularities.

20 Claims, 8 Drawing Sheets

REMOVING IRREGULARITIES FROM SEISMIC DATA CAUSED BY TUBE WAVES

The present application claims priority on European Patent Application 01304236.1 filed on 11 May 2001.

FIELD OF THE INVENTION

The present invention relates to removing irregularities from seismic data caused by tube waves. Tube waves are sound waves in a borehole. Such tube waves are encountered when a seismic survey is carried out such that the seismic sources or the seismic receivers or both the seismic sources and the seismic receivers are located in a borehole. A disadvantage of tube waves is that the seismic signals from relevant events are mixed with the signals generated by the tube waves, and therefore the valuable information is substantially invisible.

BACKGROUND OF THE INVENTION

U.S. Pat. No. 4,992,995 discloses a method for attenuating noise in seismic data. The method comprises obtaining a set of seismic data sorted into gathers of seismic signals, aligning selected coherent events, sorting the gathers in order to disorder the sequential order of the seismic signals in each gather, filtering the disordered gathers with a spatial filter, resorting the filtered signals in their original order, and combining the filtered signals with a respective gather of seismic singles to obtain a gather of seismic signals that is substantially free of unwanted coherent and random noise.

U.S. Pat. No. 5,237,538 also discloses a method of removing coherent noise from seismic traces.

U.S. Pat. No. 5,392,213 discloses a method for suppressing coherent noise from seismic or borehole data, which method comprises horizontally aligning the traces, comparing the amplitude, phase and/or shape of neighbouring traces, and subtracting traces from neighbouring traces only when the local correlation is high.

SUMMARY OF THE INVENTION

It is an object of the present invention to provide a method that effectively removes the irregularities caused by tube waves.

To this end the method of removing irregularities caused by tube waves from seismic data obtained in a borehole seismic survey, using a first set of transducers (seismic receivers or sources) and a second set of transducers (seismic sources or receivers) and wherein at least the transducers of the first set are arranged in a borehole, according to the present invention comprises the steps as outlined in claim 1.

BRIEF DESCRIPTION OF THE DRAWINGS

The invention will now be explained by way of example in more detail with reference to the accompanying drawings, wherein.

DETAILED DESCRIPTION OF THE PREFERRED EMBODIMENT

In order to apply the method according to the present invention there are needed two sets of transducers: a first set of transducers (seismic receivers or sources) and a second set of transducers (seismic sources or receivers). The possible configurations of these two sets are now discussed with reference to FIGS. 1–3.

Figure 1:
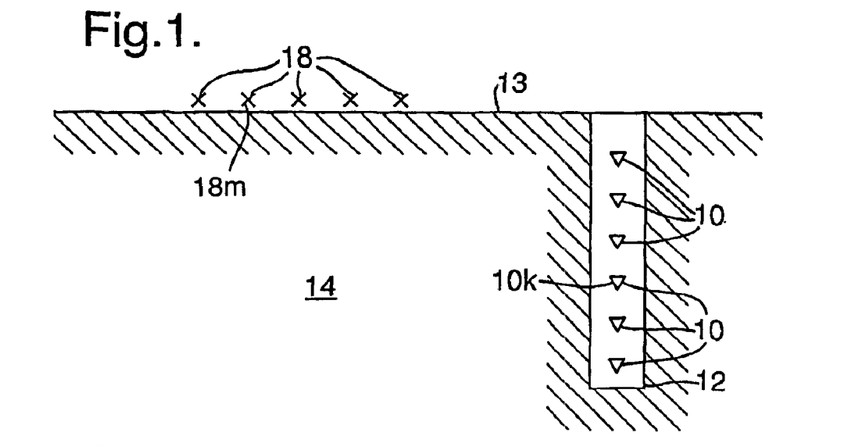
FIG. 1 shows schematically and not to scale a first configuration of the transducers for application of the method according to the present invention.

Reference is now made to FIG. 1. The first set of transducers is a set of seismic receivers 10 arranged in a borehole 12 extending from surface 13 into the earth 14 and the second set of transducers is a set of seismic sources 18 arranged at the surface 13.

Figure 2:
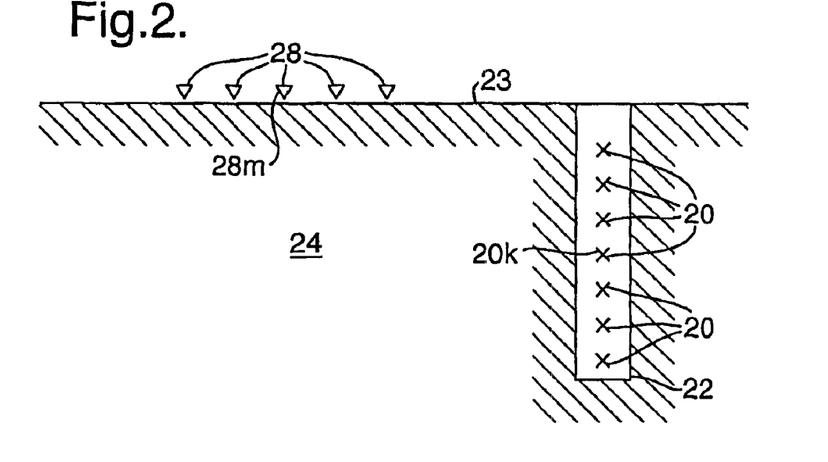
FIG. 2 shows schematically and not to scale a second configuration of the transducers for application of the method according to the present invention.

Reference is now made to FIG. 2. In this Figure the sets are interchanged. The first set of transducers is now a set of seismic sources 20 arranged in a borehole 22 extending from surface 23 into the earth 24, and the second set of transducers is a set of seismic receivers 28 arranged at the surface 23.

Figure 3:
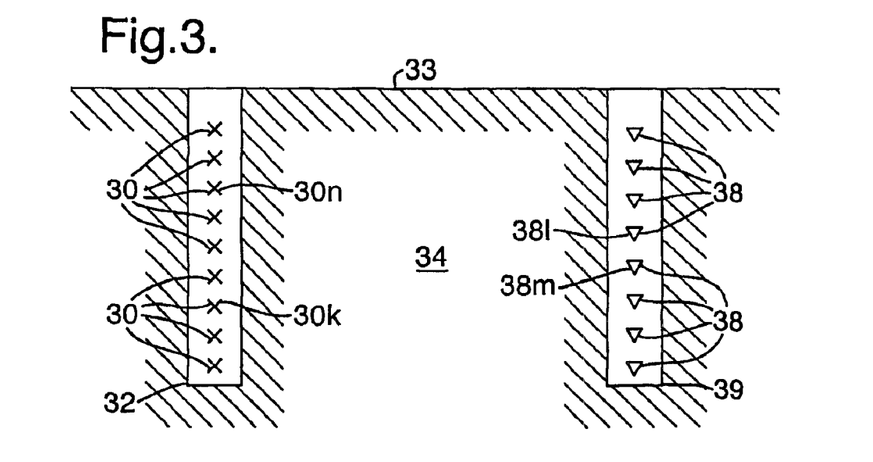
FIG. 3 shows schematically and not to scale a third configuration of the transducers for application of the method according to the present invention.

Reference is now made to FIG. 3. The first set of transducers is a set of seismic sources 30 arranged in a first borehole 32 extending from surface 33 into the earth 34 and the second set of transducers is a set of seismic receivers 38 arranged in a second borehole 39 extending from the surface 33 into the earth 34.

It will be understood that the boreholes 12, 22, 32 and 39 are filled with a liquid, that they need not be vertical and that the boreholes can be cased.

The first step of the method of removing irregularities caused by tube waves from seismic data obtained in a borehole seismic survey is obtaining a set of original seismic data $p_m(t,k)$, wherein the integer k refers to the k'th transducer of the first set of transducers and the integer m refers to the m'th transducer of the second set of transducers. The seismic data for a fixed k and m is also called a trace.

The original seismic data set $p_m(k,t)$ can be grouped in two ways. A first way is to combine for each seismic source a number of traces equal to the number of seismic receivers. When the data are grouped in this way each set of traces is called a common source (or common shot) gather. It will be understood that there are as many different common source gathers as there are seismic sources. However, the data can also be grouped in a different way: for each seismic receiver a number of traces equal to the number of seismic sources. This is called a common receiver gather, and there are as many different common receiver gathers as there are receivers.

The method according to the invention will now be explained with reference to the FIGS. 1–3.

In the configuration shown in FIG. 1, the seismic receivers 10 (the first set of transducers) are arranged in the borehole 12 and the seismic sources 18 (the second set of transducers) are arranged at the surface 13. The first step of the method according to the present invention is obtaining a set of original seismic data $p_m(t,k)$, wherein the integer k refers to the k'th seismic receiver of the set of seismic receivers 10 (the first set) in the borehole 12 and the integer m refers to the m'th seismic source of the set of seismic sources 18 (the second set).

When the seismic receivers are arranged in the borehole, it is convenient to group the original seismic data in a common source gather, thus for each source 18m there are grouped a number of traces, each trace belonging to a receiver 10k, wherein k is in the range of from 1 to the number of receivers. The number of common source gathers can equal the number of sources.

The method of the present invention removes the effect of tube waves generated in the borehole 12 in which the seismic receivers 10 are arranged. Thereto the original seismic data set is subjected to a time-shift based on an estimated tube wave velocity to align the tube waves in time so that a set of time-shifted data $\tilde{p}_m(t,k)$ is obtained.

Then a structurally oriented, edge-preserving filter is applied to the time-shifted seismic data set $\tilde{p}_m(t,k)$ to obtain a set of time-shifted, predicted tube wave data $\tilde{q}_m(t,k)$. The time shift for the time-shifted, predicted tube wave data set $\tilde{q}_m(t,k)$ is undone to obtain a set of predicted tube wave data $q_m(t,k)$. Subsequently the predicted tube wave data set $q_m(t,k)$ is subtracted from the original seismic data set $p_m(t,k)$ to obtain a set of corrected seismic data $p^c_m(t,k)$, and the original seismic data set is replaced by the corrected seismic data set.

The now original seismic data set (common source gather) has been corrected for tube wave in the borehole 12 having an estimated velocity in one direction, and next a correction is made for a tube wave having this velocity in opposite direction. This is done by repeating the steps that are described in the preceding paragraph. The result of this two-step operation is a set of seismic data of which irregularities caused by tube waves in the borehole 12 have been removed.

An edge-preserving filter is a filter that removes noise and other unwanted components from data without destroying discontinuities in the data, and a structurally oriented filter is an adaptive filter that acts differently in different directions, wherein the directions are computed from the data. An advantage of an edge-preserving filter is that it does not suppress the first arrival.

Subjecting the data set $p_m(t,k)$ to a time-shift to align the tube waves in time is done in accordance with the following equation $\tilde{p}_m(t,k)=p_m(t\pm z_k/v_{tube},k)$. Undoing the time shift for a time-shifted, predicted tube wave data set $\tilde{q}_m(t,k)$ is done in accordance with the following equation $q_m(t,k)=\tilde{q}_m(t\mp z_k/v_{tube},k)$. In these equations t is time, $z_k$ is the depth along the borehole 12 of receiver k, $v_{tube}$ is the magnitude of the tube wave velocity, and the plus sign refers to tube waves in one direction and the minus sign to tube waves in the opposite direction.

In the configuration shown in FIG. 2, the seismic sources 20 (the first set of transducers) are arranged in the borehole 22 and the seismic receivers 28 (the second set of transducers) are arranged at the surface 23. The first step of the method according to the present invention is obtaining a set of original seismic data $p_m(t,k)$, wherein the integer k refers to the k'th seismic source of the set of seismic sources 20 (the first set) in the borehole 22 and the integer m refers to the m'th seismic receiver of the set of seismic receivers 28 (the second set). When the seismic sources are arranged in the borehole, it is convenient to group the original seismic data in a common receiver gather, thus for each receiver 28m there are a number of traces, each trace belonging to a source 20k, wherein k is in the range of from 1 to the number of sources. The number of common receiver gathers can equal the number of receivers.

The method of the present invention removes the effect of tube waves generated in the borehole 22 in which now the seismic sources 20 are arranged. Thereto the original seismic data set is subjected to a time-shift based on an estimated tube wave velocity to align the tube waves in time so that a set of time-shifted data $\tilde{p}_m(t,k)$ is obtained.

Then a structurally oriented, edge-preserving filter is applied to the time-shifted seismic data set $\tilde{p}_m(t,k)$ to obtain a set of time-shifted, predicted tube wave data $\tilde{q}_m(t,k)$. The time shift for the time-shifted, predicted tube wave data set $\tilde{q}_m(t,k)$ is undone to obtain a set of predicted tube wave data $q_m(t,k)$. Subsequently the predicted tube wave data set $q_m(t,k)$ is subtracted from the original seismic data set $p_m(t,k)$ to obtain a set of corrected seismic data $p^c_m(t,k)$, and the original seismic data set is replaced by the corrected seismic data set.

The now original seismic data set (common receiver gather) has been corrected for tube wave in the borehole 22 having an estimated velocity in one direction, and next a correction is made for a tube wave having this velocity in opposite direction. This is done by repeating the steps that are described in the preceding paragraph. The result of this two-step operation is a set of seismic data of which irregularities caused by tube waves in the borehole 12 have been removed.

Subjecting the data set $p_m(t,k)$ to a time-shift to align the tube waves in time is done in accordance with the following equation $\tilde{p}_m(t,k)=p_m(t\pm z_k/v_{tube},k)$. Undoing the time shift for a time-shifted, predicted tube wave data set $\tilde{q}_m(t,k)$ is done in accordance with the following equation $q_m(t,k)=\tilde{q}_m(t\mp z_k/v_{tube},k)$. In these equations, t is time, $z_k$ is the depth along the borehole 22 of source k, $v_{tube}$ is the magnitude of the tube wave velocity, and the plus sign refers to tube waves in one direction and the minus sign to tube waves in the opposite direction.

Please note that the depth $z_k$ refers to the depth along the borehole of the transducer that is present in the borehole, which is in FIG. 1 the seismic receiver and in FIG. 2 the seismic source.

In the configuration shown in FIG. 3, the seismic sources 30 (the first set of transducers) are arranged in the borehole 32 and the seismic receivers 38 (the second set of transducers) are arranged in the borehole 39. Thus now there are two boreholes in which tube waves occur. The effect of the tube waves in both boreholes has to be removed. Because there are two boreholes, the seismic data can now be grouped in a common source gather or in a common receiver gather. The method now comprises two correction steps. The first correction step is done on the data grouped in a common source gather and the second correction step is done on the corrected data from the first step grouped in a common receiver gather. Please note that the sequence of the correction step is not relevant.

The first step of the method according to the present invention is obtaining a set of original seismic data $p_m(t,k)$, wherein the integer k refers to the k'th seismic source of the set of seismic sources 30 (the first set) and the integer m refers to the m'th seismic receiver of the set of seismic receivers 38 (the second set). The data are at first grouped in a common receiver gather, thus for each receiver $38m$ there are a number of traces, each trace belonging to a source $30k$, wherein k is in the range of from 1 to the number of sources. The number of common receiver gathers can equal the number of receivers.

The method of the present invention removes the effect of tube waves generated in the borehole 32 in which now the seismic sources 30 are arranged. Thereto the original seismic data set is subjected to a time-shift based on an estimated tube wave velocity to align the tube waves in time so that a set of time-shifted data $\tilde{p}_m(t,k)$ is obtained.

Then a structurally oriented, edge-preserving filter is applied to the time-shifted seismic data set $\tilde{p}_m(t,k)$ to obtain a set of time-shifted, predicted tube wave data $\tilde{q}_m(t,k)$. The time shift for the time-shifted, predicted tube wave data set $\tilde{q}_m(t,k)$ is undone to obtain a set of predicted tube wave data $q_m(t,k)$. Subsequently the predicted tube wave data set $q_m(t,k)$ is subtracted from the original seismic data set $p_m(t,k)$ to obtain a set of corrected seismic data $p^c_m(t,k)$, and the original seismic data set is replaced by the corrected seismic data set.

The now original seismic data set (common receiver gather) has been corrected for tube wave in the borehole 32 having an estimated velocity in one direction, and next a correction is made for a tube wave having this velocity in opposite direction. This is done by repeating the steps that are described in the preceding paragraph. The result of this two-step operation is a set of seismic data of which irregularities caused by tube waves in the borehole 32 have been removed.

Subjecting the data set $p_m(t,k)$ to a time-shift to align the tube waves in time is done in accordance with the following equation $\tilde{p}_m(t,k)=p_m(t\pm z_k/v_{tube},k)$. Undoing the time shift for a time-shifted, predicted tube wave data set $\tilde{q}_m(t,k)$ is done in accordance with the following equation $q_m(t,k)=\tilde{q}_m(t\mp z_k/v_{tube},k)$. In these equations, t is time, $z_k$ is the depth along the borehole 32 of source k, $v_{tube}$ is the magnitude of the tube wave velocity, and the plus sign refers to tube waves in one direction and the minus sign to tube waves in the opposite direction.

Then the tube waves in the borehole 39 are removed. To this end the data are grouped in a common source gather.

The next step is arranging the data in a common source gather, $p_n(t,l)$, wherein the integer l refers to the l'th seismic receiver of the set of seismic receivers 38 (the second set) in the borehole 39 and the integer n refers to the n'th seismic source of the set of seismic sources 30 (the first set). Thus for each source $30n$ there are a number of traces, each trace belonging to a receiver $38l$, wherein l is in the range of from 1 to the number of receivers. The number of common source gathers can equal the number of sources.

To remove the effect of tube waves in the second borehole 39, hereto the seismic data set previously obtained is subjected to a time-shift based on an estimated tube wave velocity to align the tube waves in time so that a set of time-shifted data $\tilde{p}_n(t,l)$ is obtained.

Then a structurally oriented, edge-preserving filter is applied to the time-shifted seismic data set $\tilde{p}_n(t,l)$ to obtain a set of time-shifted, predicted tube wave data $\tilde{q}_n(t,l)$. The time shift for the time-shifted, predicted tube wave data set $\tilde{q}_n(t,l)$ is undone to obtain a set of predicted tube wave data $q_n(t,l)$. Subsequently the predicted tube wave data set $q_n(t,l)$ is subtracted from the original seismic data set $p_n(t,l)$ to obtain a set of corrected seismic data $p^c_n(t,l)$, and the original seismic data set is replaced by the corrected seismic data set.

The now original seismic data set (common source gather) has been corrected for tube wave in the borehole 12 having an estimated velocity in one direction, and next a correction is made for a tube wave having this velocity in opposite direction. This is done by repeating the steps that are described in the preceding paragraph. The result of this two-step operation is a set of seismic data of which irregularities caused by tube waves in the boreholes 32 and 39 have been removed.

Subjecting the data set $p_n(t,l)$ to a time-shift to align the tube waves in time is done in accordance with the following equation $\tilde{p}_n(t,l)=p_n(t\pm z_l/v_{tube},l)$. Undoing the time shift for a time-shifted, predicted tube wave data set $\tilde{q}_n(t,l)$ is done in accordance with the following equation $q_n(t,l)=\tilde{q}_n(t\mp z_l/v_{tube},l)$. In these equations, t is time, $z_l$ is the depth along the borehole 39 of receiver l, $v_{tube}$ is the magnitude of the tube wave velocity, and the plus sign refers to tube waves in one direction and the minus sign to tube waves in the opposite direction.

The other steps of the method according to the present invention will now be described by way of example in more detail with reference to FIGS. 3 and 4–11.

Figure 4:
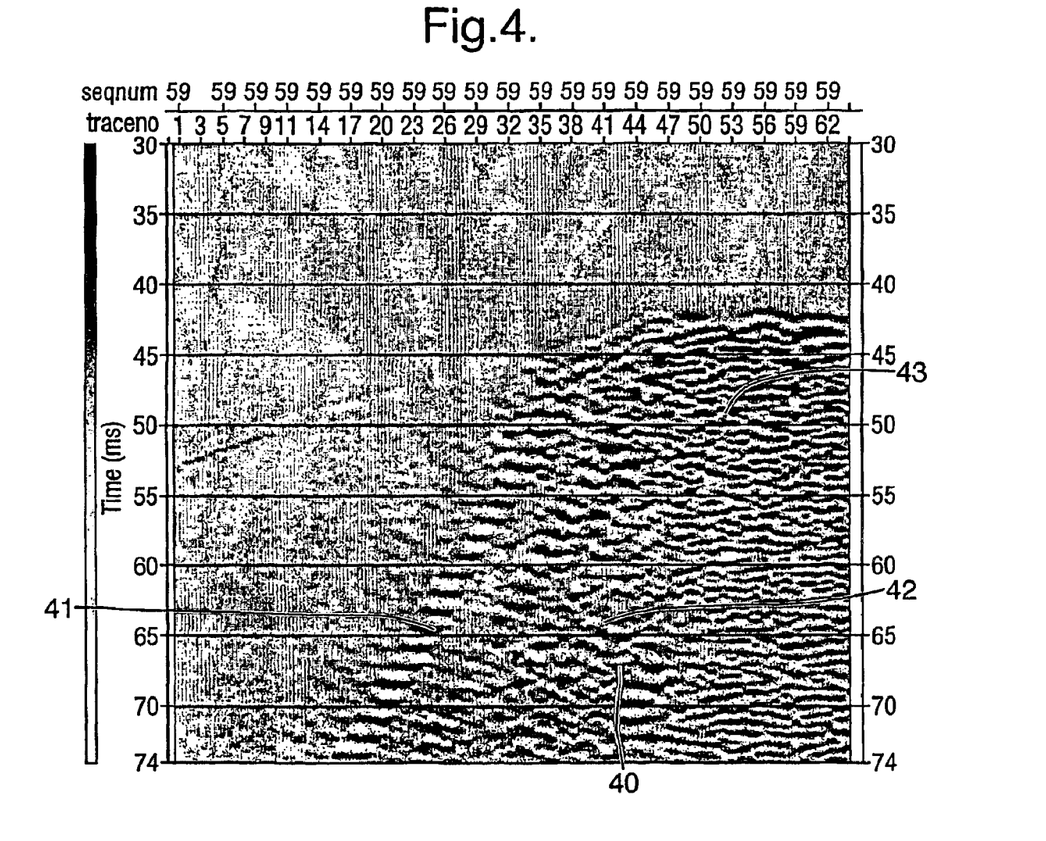
FIG. 4 shows an untreated common receiver gather.

FIG. 4 shows a common receiver gather consisting of obtained by activating a set of 64 seismic sources 30 (see FIG. 3) arranged in the first vertical borehole 32, the first of the seismic sources 30 was located at a depth of 800 m, and the interval between adjacent seismic sources was 1.9 m. In the second vertical borehole 39, located at a horizontal distance of 130 m from the first borehole 32, a set of 64 seismic receivers 38 were arranged at the same depths as the seismic sources 30. FIG. 4 shows the common receiver gather $p_k(t,m)$ obtained for receiver k=59, wherein m=1, . . . , 64. The original seismic data is referred to with reference numeral 40. Clearly visible are the tube waves 41 and 42. Reference numeral 43 refers to a reflection of a reflector.

Figure 5:
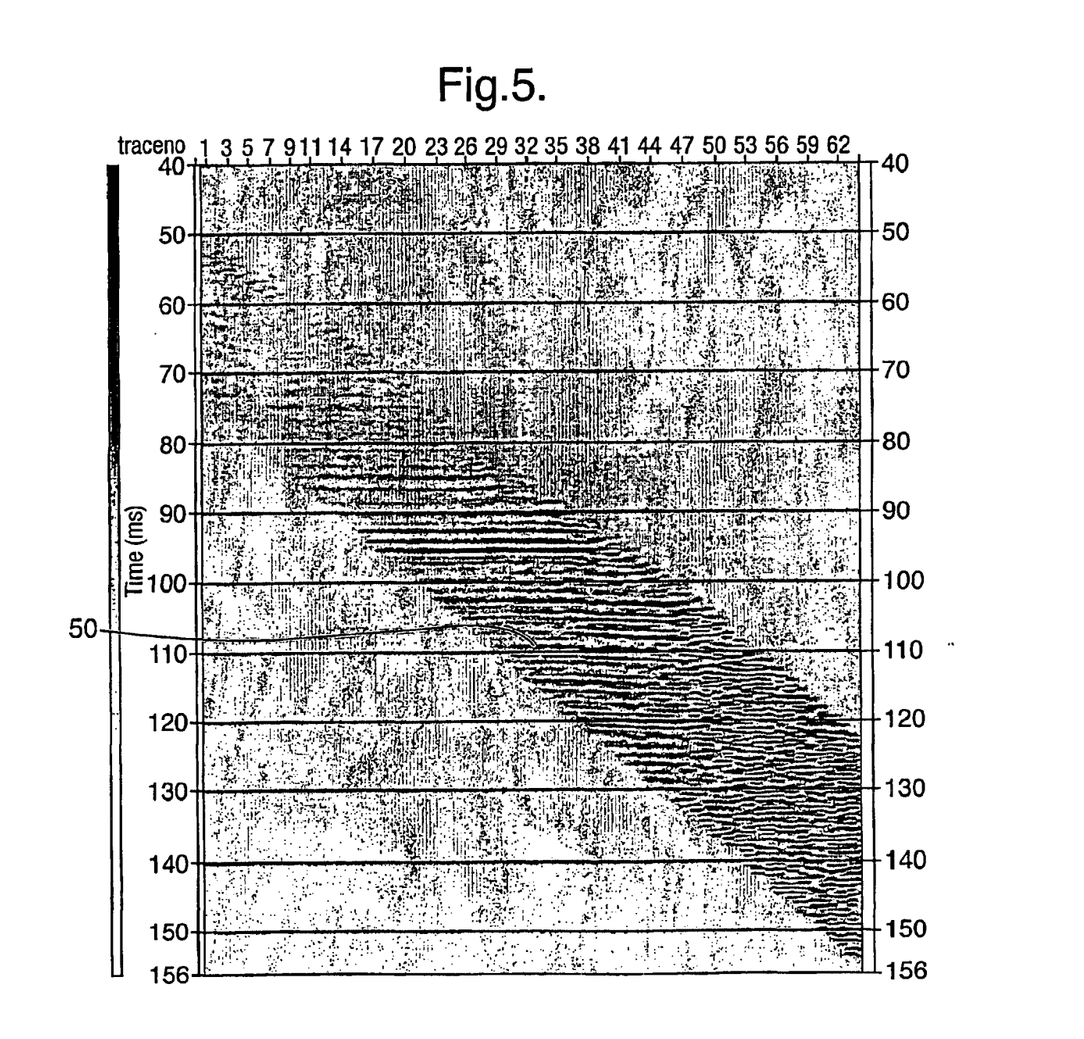
FIG. 5 shows the common receiver gather after subjecting the data to a time shift.

The original seismic data set $p_k(t,m)$ is subjected to a time-shift based on an estimated tube wave velocity to align the tube waves in time so that a set of time-shifted data $\tilde{p}_k(t,m)$ is obtained. Subjecting the data set to a time shift is governed by the following equation $\tilde{p}_k(t,m)=p_k(t\pm z_m/v_{tube},m)$, wherein the plus sign refers to tube waves moving in one direction, and the minus sign refers to tube waves moving in the opposite direction, wherein $z_m$ is the depth along the borehole 39 of receiver m, and wherein $v_{tube}$ is the magnitude of the tube wave velocity. FIG. 5 shows the common receiver gather after applying the time shift $\tilde{p}_k(t,m)=p_k(t-z_m/v_{tube},m)$, wherein k=59, $v_{tube}$=1480 m/s and m=1, . . . , 64. FIG. 5 shows clearly that by applying the time shift, the tube waves 50 are aligned in time. Please note that the data shown in FIGS. 5–7 have a reference time that differs from the reference time used in FIGS. 4 and 8–10. This was done for practical reasons and it does not affect the overall result.

Next the tube wave data will be predicted so that in the end they can be removed from the original data set. In order to predict the tube wave data a structurally oriented, edge-preserving filter is applied to each element of the time-shifted seismic data set $\tilde{p}_k(t,m)$ to obtain a set of time-shifted, predicted tube wave data $\tilde{q}_k(t,m)$. In this case k=59 m=1, . . . , 64.

Suitably, applying the structurally oriented, edge-preserving filter to the time-shifted seismic data set $\tilde{p}_m(t,m)$ to obtain a set of time-shifted, predicted tube wave data set $\tilde{q}_m(t,m)$ comprises first determining for each element of the data set $\tilde{p}_m(t,m)$ the local orientation of the time-shifted seismic data, which local orientation is the orientation of a plane tangent to the time-shifted seismic data for that element. Then for each element one determines whether there is an edge in its neighbourhood. Finally an averaging operation is carried out for each element of the data set $\tilde{p}_m(t,m)$, wherein the direction of the averaging operation is the local orientation of the data and wherein the averaging operation does not go over the edge, to obtain the set of time-shifted, predicted-tube wave data set $\tilde{q}_m(t,m)$.

Applying the structurally oriented, edge-preserving filter to the time-shifted seismic data set $\tilde{p}_m(t,m)$ to obtain the set of time-shifted, predicted tube wave data set $\tilde{q}_m(t,m)$ suitably comprises first defining a window of $n_L+n_R+1$ traces centred on trace m and $2n_t+1$ time samples centred on $t_n=t_0+n\Delta t$, wherein $t_0$ is the time at which sampling starts. Then a semblance measure is calculated in accordance with the following equation $$S^0(t_n, m) = \frac{\sum_{l=-n_t}^{n_t}\left(\sum_{k=-n_L}^{n_R} \tilde{p}(t_n + l\Delta t, m + k)\right)^2}{(n_L + n_R + 1)\sum_{l=-n_t}^{n_t}\sum_{k=-n_L}^{n_R} \tilde{p}^2(t_n + l\Delta t, m + k)}.$$

account for variations in the estimated velocity of the tube wave, two further semblance measures $S^+$ and $S^-$ are calculated, wherein the data used to calculate the two further semblance measures is $\tilde{p}(t\pm\alpha z_k,m+k)$, wherein $\alpha$ is a slowness parameter, and wherein $z_k$ is the distance along the borehole between transducers m and k. Having calculated the three semblance measures the maximum value $\alpha_{max}$ of the slowness parameter is calculated. The maximum value of the slowness parameter is calculated as follows: given $S^0$, $S^+$ and $S^-$ a dummy variable $\xi$ is defined, such that $S(\xi=0)=S^0$, $S(\xi=1)=S^+$, and $S(\xi=-1)=S^-$, then a parabola is fit through these three values, and its maximum $S^{max}=S(\xi_{max})$ is computed on the interval $[-1,1]$ for $\xi$. The maximum value of the slowness parameter then is $\alpha_{max}=\alpha.\xi_{max}$. Then the time-shifted tube wave data by taking the median of $\tilde{p}(t+\alpha_{max}z_k,m+k)$, wherein $-n_L \leq k \leq n_R$.

To account for abrupt changes in the velocity of the tube waves, the steps discussed in the above paragraph are repeated for three ranges: a left range (L), wherein $n_L=n_k$ and $n_R=0$, a central range (C), wherein $n_L=n_k$ and $n_R=n_k$; and a right range (R), wherein $n_L=0$ and $n_R=n_k$. This gives $S_L$max and $\tilde{q}_L$, $S_C$max and $\tilde{q}_C$, and $S_R$max and $\tilde{q}_R$, respectively. The integer $n_k$ has a predetermined value. Then the time-shifted, predicted tube wave data are selected as follows, if $S_C^{max}>\epsilon.\max(S_L^{max}, S_R^{max})$ then the time-shifted, predicted tube wave data are $\tilde{q}_C$, else, if $S_R^{max}>S_L^{max}$ then the time-shifted, predicted tube wave data are $\tilde{q}_R$, else the time-shifted, predicted tube wave data are $\tilde{q}_L$.

If the semblance measure corresponding to the chosen prediction is smaller than a threshold value $S^{min}$, the predicted tube wave data are set to zero.

Figure 6:
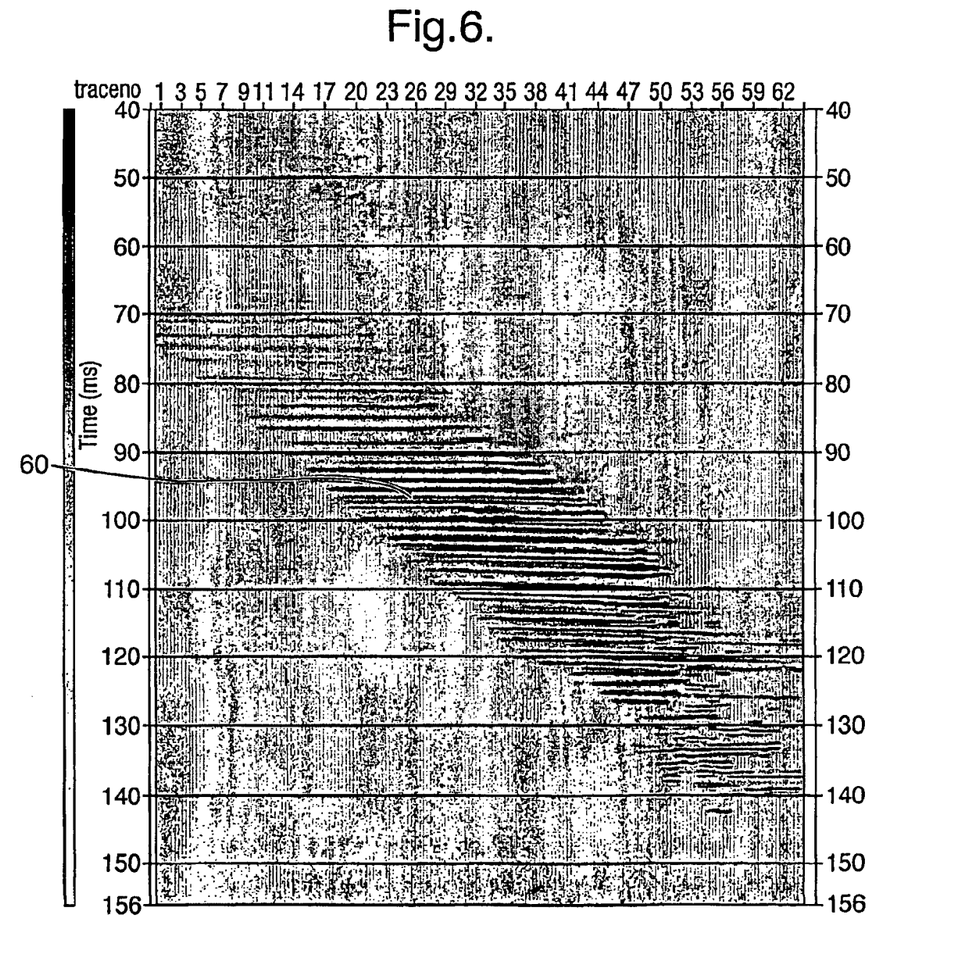
FIG. 6 shows the time-shifted, predicted tube wave data.

FIG. 6 shows the time-shifted, predicted tube wave data 60, for $n_k=8$, $n_t=9$, $\alpha=0.03/v_{tube}$, $\epsilon=0.5$ and $S^{min}=0.1$.

These tube wave data can be transformed by undoing the time shift for the time-shifted, predicted tube wave data set $\tilde{q}_k(t,m)$ to obtain a set of predicted tube wave data $q_k(t,m)$. And these data can be subtracted from the original data to obtain a set of correct original seismic data. However, suitably, a correction is applied on the time-shifted, predicted tube wave data in order to remove uncorrelated data, because uncorrelated data are considered not to be part of the tube wave data.

Thereto the step of applying a structurally oriented, edge-preserving filter to the time-shifted seismic data set $\tilde{p}_k(t,m)$ to obtain a set of time-shifted, predicted tube wave data $\tilde{q}_k(t,m)$ further comprises correlating for each element of the set of time-shifted, predicted tube wave data with the time-shifted seismic data set, and removing the less well correlated elements from the set of time-shifted, predicted tube wave data.

Suitably, correlating the set of time-shifted, predicted tube wave data with the time-shifted seismic data set, and removing the less well correlated elements from the set of time-shifted, predicted tube wave data comprises determining a correlation measure and if the correlation measure is less than a predetermined minimum value $C^{min}$, the time-shifted, predicted tube wave data are made equal to zero.

The correlation measure is suitably $$C(t_n, m) = 2\frac{\sum_{l=-n_t}^{n_t} \tilde{p}(t_n + l\Delta t, m)\cdot \tilde{q}(t_n + l\Delta t, m)}{\sum_{l=-n_t}^{n_t}\{\tilde{p}^2(t_n + l\Delta t, m) + \tilde{q}^2(t_n + l\Delta t, m)\}}.$$

Figure 7:
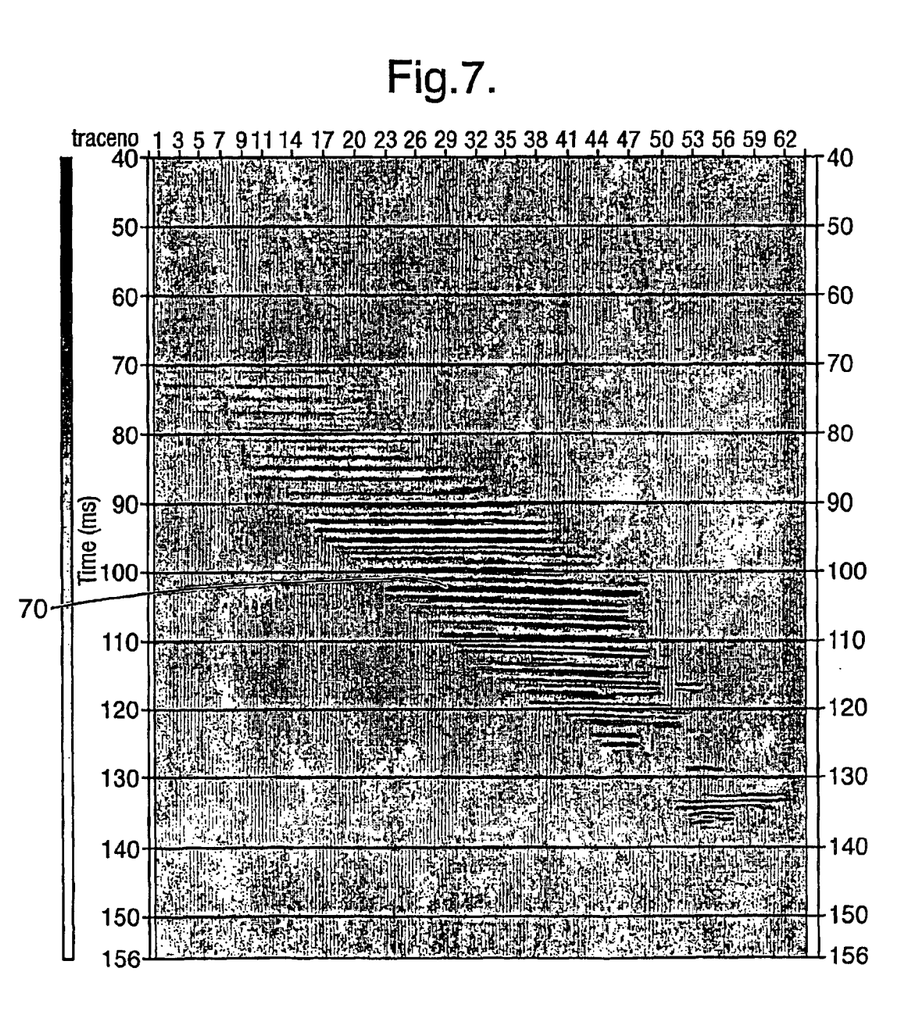
FIG. 7 shows the time-shifted, predicted tube wave data after the correlation check.

FIG. 7 shows the time-shifted, predicted tube wave data $\tilde{q}_k(t,m)$, referred to with reference numeral 70 after the correlation check with $C^{min}=0.3$.

Then the time shift is undone for the time-shifted, predicted tube wave data set $\tilde{q}_k(t,m)$ to obtain a set of predicted tube wave data $\tilde{q}_k(t,m)$. Undoing the time shift for a time-shifted, predicted tube wave data set $\tilde{q}_i(t,j)$ is done in accordance with the following equation $q_i(t,j)=\tilde{q}_i(t\mp z_j/v_{tube},j)$, and for the particular case the equation is $q_k(t,m)=\tilde{q}_k(t\mp z_m/v_{tube},m)$.

Figure 8:
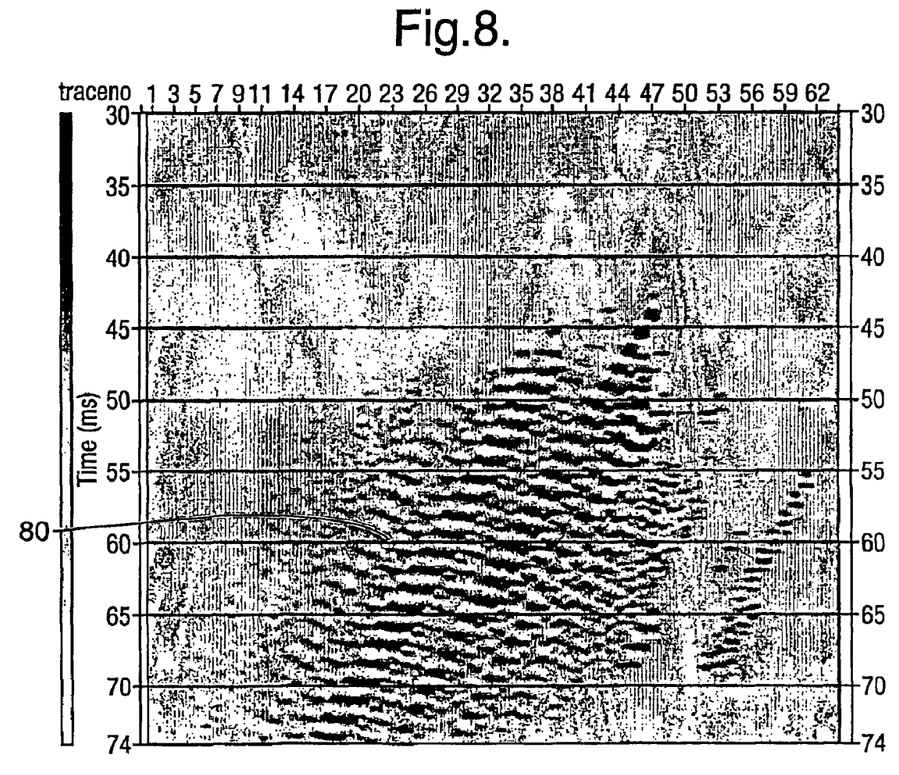
FIG. 8 shows the predicted tube wave data set in the original domain.

FIG. 8 shows the predicted tube wave data set $q_k(t,m)$, referred to with reference numeral 80 in the original domain.

Then the predicted tube wave data set $q_k(t,m)$ is subtracted from the original seismic data set $p_k(t,m)$ to obtain a set of corrected seismic data $p^c_k(t,m)$, and the original seismic data set is replaced by the corrected seismic data set.

Figure 9:
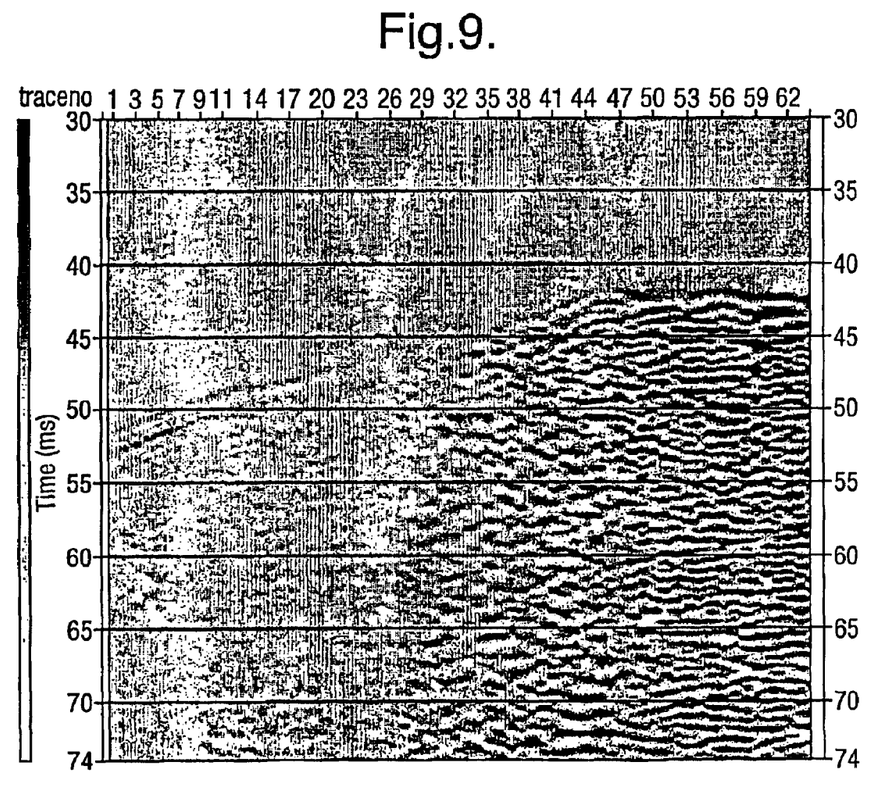
FIG. 9 shows the common receiver gather of FIG. 4 after subtraction of the predicted tube waves.

Then the above-described steps are repeated for a tube wave velocity that is opposite to the tube wave velocity used to obtain the result shown in FIG. 9.

Figure 10:
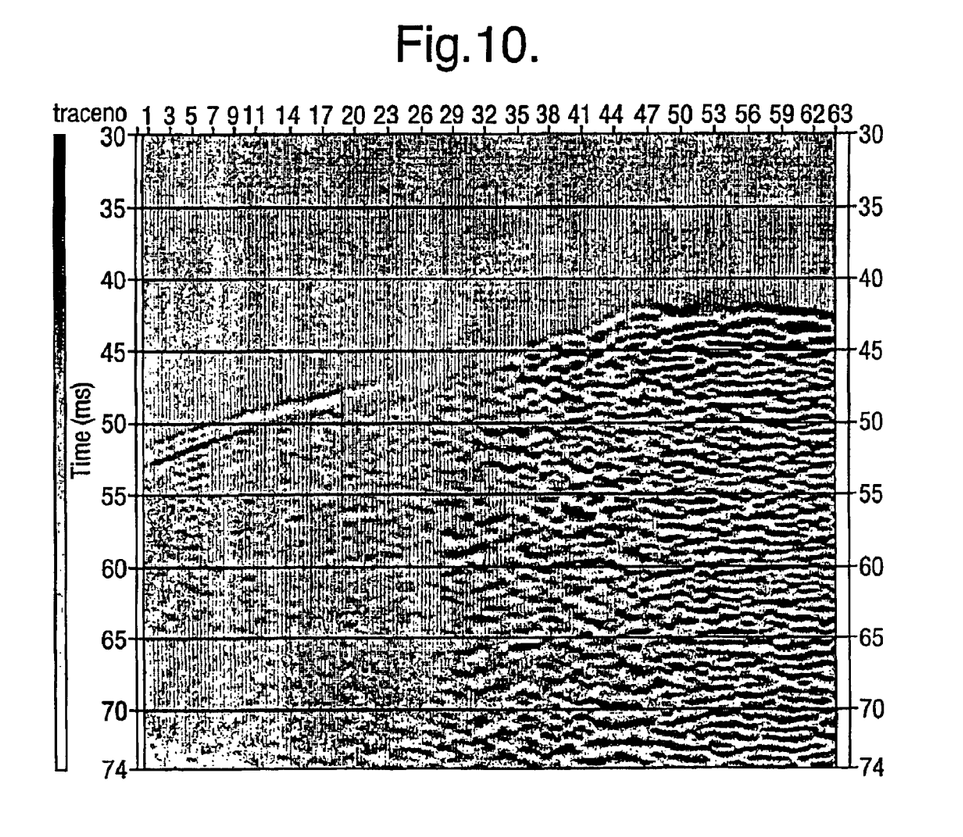
FIG. 10 shows the final result of applying the method of the present invention on the common receiver gather of FIG. 4.

Then the data are grouped as common source gathers $p_n(t,l)$, and the steps as described with reference to FIG. 3 for the common source gathers are repeated to remove the effect of tube waves in the borehole 32. The correction was applied with the parameters given above. Then the corrected data are grouped as common receiver gathers and the receiver gather for receiver 59 is shown in FIG. 10. FIG. 10 shows clearly the effect of the method according to the present invention on the final result of removing the effects of tube waves for the common receiver gather of FIG. 4.

The method of the present invention includes using a structurally oriented edge-preserving filter, wherein the structurally oriented approach reduces errors due to small variations in the tube wave velocity, and wherein the edge-preserving approach allows proper handling of the start or abrupt changes in the tube waves. Optionally the method includes removing less well correlated elements from the set of time-shifted, predicted tube wave data. This optional step reduces the chance of removing a true event during the subtraction.

While the illustrative embodiments of the invention have been described with particularity, it will be understood that various other modifications will be readily apparent to, and can be easily made by one skilled in th art without departing from the spirit of the invention. Accordingly, it is not intended that the scope of the following claims be limited to the examples and descriptions set forth herein but rather that the claims be construed as encompassing all features which would be treated as equivalents thereof by those skilled in the art to which this invention pertains.

We claim:

1. A method of removing irregularities caused by tube waves from seismic data obtained in a borehole seismic survey, using a first set of transducers (seismic receivers or sources) and a second set of transducers (seismic sources or receivers) and wherein at least the transducers of the first set are arranged in a borehole, which method comprises the steps of (a) obtaining a set of original seismic data $p_m(t,k)$, wherein the integer k refers to the k'th transducer of the first set of transducers and the integer m refers to the m'th transducer of the second set of transducers;

(b) subjecting the original seismic data set to a time-shift based on an estimated tube wave velocity to align the tube waves in time so that a set of time-shifted data $\tilde{p}_m(t,k)$ is obtained;

(c) applying a filter to the time-shifted seismic data set $\tilde{p}_m(t,k)$ to obtain a set of time-shifted, predicted tube wave data $\tilde{q}_m(t,k)$;

(d) undoing the time shift for the time-shifted, predicted tube wave data set $\tilde{q}_m(t,k)$ to obtain a set of predicted tube wave data $q_m(t,k)$;

(e) subtracting the predicted tube wave data set $q_m(t,k)$ from the original seismic data set $p_m(t,k)$ to obtain a set of corrected seismic data $p^c_m(t,k)$, and the original seismic data set by the corrected seismic data set;

(f) subjecting the set of corrected, original seismic data to a time-shift based on a tube wave velocity opposite to the velocity used in step (b) to align the tube waves in time so that a set of time-shifted data $\tilde{p}_m(t,k)$ is obtained; and (g) repeating steps (c), (d) and (e) to obtain a set of seismic data of which irregularities caused by tube waves have been removed, characterized in that the filter applied in step (c) is a structurally oriented edge-preserving filter.

2. The method according to claim 1, wherein step (c) comprises applying a structurally oriented, edge-preserving filter to the time-shifted seismic data set $\tilde{p}_m(t,k)$ to obtain a set of time-shifted, predicted tube wave data $\tilde{q}_m(t,k)$, correlating the set of time-shifted, predicted tube wave data with the time-shifted seismic data set, and removing the less well correlated elements from the set of time-shifted, predicted tube wave data.

3. The method according to claim 2, wherein correlating the set of time-shifted, predicted tube wave data with the time-shifted seismic data set, and removing the less well correlated elements from the set of time-shifted, predicted tube wave data comprises determining a correlation measure and if the correlation measure is less than a predetermined minimum value, the time-shifted, predicted tube wave data are made equal to zero.

4. The method according to claim 3, wherein the correlation measure is $$C(t_n, j) = 2 \frac{\sum_{l=-n_t}^{n_t} \tilde{p}(t_n + l\Delta t, j) \cdot \tilde{q}(t_n + l\Delta t, j)}{\sum_{l=-n_t}^{n_t} \{\tilde{p}^2(t_n + l\Delta t, j) + \tilde{q}^2(t_n + l\Delta t, j)\}}.$$

5. The method according to claim 2, wherein also the transducers of the second set of transducers are located in a borehole, which differs from the borehole in which the transducers of the first set are located, which method further comprises the steps of (h) subjecting the set of seismic data obtained in step (i) to a time-shift to based on an estimated tube wave velocity to align the tube waves in time so that a set of time-shifted data $\tilde{p}_n(t,l)$ is obtained, wherein the integer l refers to the l'th transducer of the second set and the integer n refers to the n'th transducer of the first set;

(i) applying a structurally oriented, edge-preserving filter to the time-shifted seismic data set $\tilde{p}_n(t,l)$ to obtain a set of time-shifted, predicted tube wave data $\tilde{q}_n(t,l)$;

(j) undoing the time shift for the time-shifted, predicted tube wave data set $\tilde{q}_n(t,l)$ to obtain a set of predicted tube wave data $q_n(t,l)$;

(k) subtracting the predicted tube wave data set $q_n(t,l)$ from the original seismic data set $p_n(t,l)$ to obtain a set of corrected seismic data $p^c_n(t,l)$, and replacing the original seismic data by the corrected seismic data;

l) subjecting the set of corrected, original seismic data to a time-shift based on a tube wave velocity opposite to the velocity used in step (h) to align the tube waves in time so that a set of time-shifted data $\tilde{p}_n(t,l)$ is obtained, and repeating steps (i), (j) and (k);

(m) repeating steps (i) through (l) for each transducer l of the first set of transducers and for each transducer n of the second set of transducers to obtain a set of seismic data of which irregularities caused by tube waves have been removed.

6. The method according to claim 2, wherein applying a structurally oriented, edge-preserving filter to the time-shifted seismic data set $\tilde{p}_i(t,j)$ to obtain a set of time-shifted, predicted tube wave data set $\tilde{q}_i(t,j)$ comprises the steps of:

1) determining for each element of the data set $\tilde{p}_i(t,j)$ the local orientation of the time-shifted seismic data, which local orientation is the orientation of a plane tangent to the time-shifted seismic data for that element;

2) determining for each element whether there is an edge in its neighbourhood; and 3) carrying out an averaging operation for each element of the data $\tilde{p}_i(t,j)$, wherein the direction of the averaging operation is the local orientation of the data and wherein the averaging operation does not go over the edge, to obtain the set of time-shifted, predicted tube wave data set $\tilde{q}_i(t,j)$.

7. The method according to claim 2, wherein subjecting a data set $p_i(t,j)$ to a time-shift to align the tube waves in time is done in accordance with the following equation $\tilde{p}_i(t,j)=p_i(t \pm z_j/v_{tube},j)$, wherein $z_j$ is the depth along the borehole of transducer j, and wherein $v_{tube}$ is the magnitude of the tube wave velocity, and wherein undoing the time shift for a time-shifted, predicted tube wave data set $\tilde{q}_i(t,j)$ is done in accordance with the following equation $q_i(t,j)=\tilde{q}_i(t \mp z_j/v_{tube},j)$.

8. The method according to claim 1, wherein also the transducers of the second set of transducers are located in a borehole, which differs from the borehole in which the transducers of the first set are located, which method further comprises the steps of (h) subjecting the set of seismic data obtained in step (i) to a time-shift to based on an estimated tube wave velocity to align the tube waves in time so that a set of time-shifted data $\tilde{p}_n(t,l)$ is obtained, wherein the integer l refers to the l'th transducer of the second set and the integer n refers to the n'th transducer of the first set;

(i) applying a structurally oriented, edge-preserving filter to the time-shifted seismic data set $\tilde{p}_n(t,l)$ to obtain a set of time-shifted, predicted tube wave data $\tilde{q}_n(t,l)$;

(j) undoing the time shift for the time-shifted, predicted tube wave data set $\tilde{q}_n(t,l)$ to obtain a set of predicted tube wave data $q_n(t,l)$;

(k) subtracting the predicted tube wave data set $q_n(t,l)$ from the original seismic data set $p_n(t,l)$ to obtain a set of corrected seismic data $p^c_n(t,l)$, and replacing the original seismic data by the corrected seismic data;

(l) subjecting the set of corrected, original seismic data to a time-shift based on a tube wave velocity opposite to the velocity used in step (h) to align the tube waves in time so that a set of time-shifted data $\tilde{p}_n(t,l)$ is obtained, and repeating steps (i), (j) and (k);

(m) repeating steps (i) through (l) for each transducer l of the first set of transducers and for each transducer n of the second set of transducers to obtain a set of seismic data of which irregularities caused by tube waves have been removed.

9. The method according to claim 8, wherein step (i) comprises applying a structurally oriented, edge-preserving filter to the time-shifted seismic data set $\tilde{p}_n(t,l)$ to obtain a set of time-shifted, predicted tube wave data $\tilde{q}_n(t,l)$, correlating the set of time-shifted, predicted tube wave data with the time-shifted seismic set, and removing the less well correlated elements from the set of time-shifted, predicted tube wave data.

10. The method according to claim 9, wherein applying a structurally oriented, edge-preserving filter to the time-shifted seismic data set $\tilde{p}_i(t,j)$ to obtain a set of time-shifted, predicted tube wave data set $\tilde{q}_i(t,j)$ comprises the steps of:

1) determining for each element of the data set $\tilde{p}_i(t,j)$ the local orientation of the time-shifted seismic data, which local orientation is the orientation of a plane tangent to the time-shifted seismic data for that element;

2) determining for each element whether there is an edge in its neighbourhood; and 3) carrying out an averaging operation for each element of the data set $\tilde{p}_i(t,j)$, wherein the direction of the averaging operation is the local orientation of the data and wherein the averaging operation does not go over the edge, to obtain the set of time-shifted, predicted tube wave data set $\tilde{q}_i(t,j)$.

11. The method according to claim 9, wherein correlating the set of time-shifted, predicted tube wave data with the time-shifted seismic data set, and removing the less well correlated elements from the set of time-shifted, predicted tube wave data comprises determining a correlation measure and if the correlation measure is less than a predetermined minimum value, the time-shifted, predicted tube wave data are made equal to zero.

12. The method according to claim 9, wherein subjecting a data set $p_i(t,j)$ to a time-shift to align the tube waves in time is done in accordance with the following equation $\tilde{p}_i(t,j)=p_i(t\pm z_j/v_{tube},j)$, wherein $z_j$ is the depth along the borehole of transducer j, and wherein $v_{tube}$ is the magnitude of the tube wave velocity, and wherein undoing the time shift for a time-shifted, predicted tube wave data set $\tilde{q}_i(t,j)$ is done in accordance with the following equation $q_i(t,j)=\tilde{q}_i(t\mp z_j/v_{tube},j)$.

13. The method according to claim 8, wherein applying a structurally oriented, edge-preserving filter to the time-shifted seismic data set $\tilde{p}_i(t,j)$ to obtain a set of time-shifted, predicted tube wave data set $\tilde{q}_i(t,j)$ comprises the steps of:

1) determining for each element of the data set $\tilde{p}_i(t,j)$ the local orientation of the time-shifted seismic data, which local orientation is the orientation of a plane tangent to the time-shifted seismic data for that element;

2) determining for each element whether there is an edge in its neighbourhood; and 3) carrying out an averaging operation for each element of the data set $\tilde{p}_i(t,j)$, wherein the direction of the averaging operation is the local orientation of the data and wherein the averaging operation does not go over the edge, to obtain the set of time-shifted, predicted tube wave data set $\tilde{q}_i(t,j)$.

14. The method according to claim 8, wherein subjecting a data set $p_i(t,j)$ to a time-shift to align the tube waves in time is done in accordance with the following equation $\tilde{p}_i(t,j)=p_i(t\pm z_j/v_{tube},j)$, wherein $z_j$ is the depth along the borehole of transducer j, and wherein $v_{tube}$ is the magnitude of the tube wave velocity, and wherein undoing the time shift for a time-shifted, predicted tube wave data set $\tilde{q}_i(t,j)$ is done in accordance with the following equation $q_i(t,j)=\tilde{q}_i(t\mp z_j/v_{tube},j)$.

15. The method according to claim 1, wherein applying a structurally oriented, edge-preserving filter to the time-shifted seismic data set $\tilde{p}_i(t,j)$ to obtain a set of time-shifted, predicted tube wave data set $\tilde{q}_i(t,j)$ comprises the steps of:

1) determining for each element of the data set $\tilde{p}_i(t,j)$ the local orientation of the time-shifted seismic data, which local orientation is the orientation of a plane tangent to the time-shifted seismic data for that element;

2) determining for each element whether there is an edge in its neighbourhood; and 3) carrying out an averaging operation for each element of the data set $\tilde{p}_i(t,j)$, wherein the direction of the averaging operation is the local orientation of the data and wherein the averaging operation does not go over the edge, to obtain the set of time-shifted, predicted tube wave data set $\tilde{q}_i(t,j)$.

16. The method according to claim 15, wherein applying the structurally oriented, edge-preserving filter to the time-shifted seismic data set $\tilde{p}_i(t,j)$ to obtain the set of time-shifted, predicted tube wave data set $\tilde{q}_i(t,j)$ comprises the steps of:

(1) defining a window of $n_L+n_R+1$ transducers centred on transducer j and $2n_t+1$ time samples centred on $t_n=t_0+n\Delta t$, wherein $t_0$ is the time at which sampling starts;

(2) calculating a semblance measure in accordance with the following equation $$S^0(t_n, j) = \frac{\sum_{l=-n_t}^{n_t}\left(\sum_{k=-n_L}^{n_R} \tilde{p}(t_n + l\Delta t, j+k)\right)^2}{(n_L + n_R + 1)\sum_{l=-n_t}^{n_t}\sum_{k=-n_L}^{n_R} \tilde{p}^2(t_n + l\Delta t, j+k)},$$

further semblance measures $S^+$ and $S^-$ wherein the data used to calculate the two further semblance measures is $\tilde{p}(t\pm\alpha z_k, j+k)$, wherein $\alpha$ is a slowness parameter, and wherein $z_j$ is the distance along the borehole between transducers j and k and determining the slowness parameter $\alpha_{max}$ that pertains to the maximum of $S^+$, $S^0$ and $S^-$, and calculating time-shifted tube wave data by taking the median of $\tilde{p}(t+\alpha_{max}z_j, j_0+k)$, wherein $-n_L \leq k \leq n_R$;

(3) repeating step (1) for a left range (L), wherein $n_L=n_k$ and $n_R=0$, a central range (C), wherein $n_L=n_k$ and $n_R=n_k$ and for a right range (R), wherein $n_L=0$ and $n_R=n_k$ to obtain $S_L^{max}$ and $\tilde{q}_L$, $S_C^{max}$ and $\tilde{q}_C$, and $S_R^{max}$ and $\tilde{q}_R$, respectively, wherein $n_k$ is a predetermined integer; and (4) selecting the time-shifted, predicted tube wave data as follows, if $S_C^{max} > \epsilon.\max(S_L^{max}, S_R^{max})$ then the time-shifted, predicted tube wave data are $\tilde{q}_C$, else, if $S_R^{max} > S_L^{max}$ then the time-shifted, predicted tube wave data are $\tilde{q}_R$, else the time-shifted, predicted tube wave data are $\tilde{q}_L$, wherein $\epsilon$ is a predetermined constant.

17. The method according to claim 16, wherein if the semblance measure selected in step (4) is less than a minimum value the time-shifted, predicted tube wave data are made equal to zero.

18. The method according to claim 16, wherein subjecting a data set $p_r(t,j)$ to a time-shift to align the tube waves in time is done in accordance with the following equation $\tilde{p}_r(t,j) = p_r(t\pm z_j/v_{tube}, j)$, wherein $z_j$ is the depth along the borehole of transducer j, and wherein $v_{tube}$ is the magnitude of the tube wave velocity, and wherein undoing the time shift for a time-shifted, predicted tube wave data set $\tilde{q}_r(t,j)$ is done in accordance with the following equation $q_r(t,j) = \tilde{q}_r(t \mp z_j/v_{tube}, j)$.

19. The method according to claim 10, wherein subjecting a data set $p_r(t,j)$ to a time-shift to align the tube waves in time is done in accordance with the following equation $\tilde{p}_r(t,j) = p_r(t\pm z_j/v_{tube}, j)$, wherein is the depth along the borehole of transducer j, and wherein $v_{tube}$ is the magnitude of the tube wave velocity, and wherein undoing the time shift for a time-shifted, predicted tube wave data set $\tilde{q}_r(t,j)$ is done in accordance with the following equation $q_r(t,j) = \tilde{q}_r(t \mp z_j/v_{tube}, j)$.

20. The method according to claim 1, wherein subjecting a data set $p_r(t,j)$ to a time-shift to align the tube waves in time is done in accordance with the following equation $\tilde{p}_r(t,j) = p_r(t\pm z_j/v_{tube}, j)$, wherein $z_j$ is the depth along the borehole of transducer j, and wherein $v_{tube}$ is the magnitude of the tube wave velocity, and wherein undoing the time shift for a time-shifted, predicted tube wave data set $\tilde{q}_r(t,j)$ is done in accordance with the following equation $q_r(t,j) = \tilde{q}_r(t \mp z_j/v_{tube}, j)$.

* * * * *